April 14, 1925.

L. C. COLE ET AL

1,533,389

MULTIPLE DRILL

Filed Dec. 26, 1922    5 Sheets-Sheet 1

INVENTORS.
L. C. Cole, Otto Pabst
and Carl May.
BY Laurie C...
ATTORNEY.

April 14, 1925.

L. C. COLE ET AL

1,533,389

MULTIPLE DRILL

Filed Dec. 26, 1922  5 Sheets-Sheet 5

INVENTORS
L. C. Cole, Otto Pabst
and Carl May.
BY
ATTORNEY.

Patented Apr. 14, 1925.

1,533,389

UNITED STATES PATENT OFFICE.

LYNDON C. COLE, OTTO PABST, AND CARL MAY, OF HAMILTON, OHIO, ASSIGNORS TO NILES-BEMENT-POND COMPANY, OF NEW YORK, N. Y., A CORPORATION OF NEW JERSEY.

MULTIPLE DRILL.

Application filed December 26, 1922. Serial No. 609,113.

*To all whom it may concern:*

Be it known that we, LYNDON C. COLE, OTTO PABST, and CARL MAY, citizens of the United States, residing at Hamilton, in the county of Butler and State of Ohio, have invented certain new and useful Improvements in Multiple Drills, of which the following is a specification.

This invention relates particularly to multiple spindle drilling machines. In our copending application Serial No. 609,112 filed December 26, 1922, we have illustrated a multiple spindle drilling machine of the gantry crane type. The drawings accompanying this application illustrate a machine of this type and the invention herein resides particularly in the feeding mechanism for the drill spindles thereof. The primary object of the invention is to provide an improved spindle feeding mechanism particularly adapted for these machines.

It is an object of the invention to provide a multiple spindle drilling machine with a spindle feeding mechanism comprising two optionally usable driving connections, one of such driving connections being adapted to feed the spindles for drilling and the other driving connection being adapted to feed the spindles for tapping.

Another object of the invention is to provide a spindle feeding mechanism of the type last stated wherein the driving connection for drilling is frictionally operative and the driving connection for tapping is positively operative and means in connection therewith for changing the feeding speed of the spindles.

A further object of the invention is to provide a feeding mechanism of the type stated in which means is provided for rapidly traversing the drill spindles by power or for traversing the same manually, such means being operative independently of the feeding mechanism.

With the above and other objects in view, our invention consists in the features of construction and operation set forth in the following specification and illustrated in the accompanying drawings. In such drawings annexed hereto and forming a part of this specification, we have shown our invention embodied in a drilling machine of the above stated gantry crane type but it will be understood that the invention can be otherwise embodied and that the drawings are not to be construed as defining or limiting the scope of the invention, the claims appended to this specification being relied upon for that purpose.

Referring to the figures of the drawings.

Referring more specifically to the drawings by reference characters, 1 indicates a supporting bridge member along which a carriage 2 is adapted to travel. Swivelly supported on the carriage is a member 3 including a rail 4 on which is slidably mounted a plurality of drill heads 5. The construction of such mechanism, which is within itself not a part of our present invention, is more fully disclosed in the afore-mentioned copending application.

A drill spindle 6 is mounted for vertical axial movement in each head 5 and is counterbalanced by a weight 7 connected by a chain 8 to a head 9 swivelled to the spindle. The chain passes over a pair of pulleys 10 supported on a tubular bracket 11 and a rod 12 on the former of which the weight is guided. The head 9 has a forwardly extending arm 9′ riding on the rod 12 which prevents head 9 swivelling due to rotary movement of the spindle.

A feed shaft 13 and a screw 14 extend along the rail 4 transversely past each spindle head 5. A shaft 15 mounted in each head 5 is provided on its inner end with a worm wheel 16 in mesh with the screw 14. A worm 17 mounted in a bracket 18 on each head and splined to the feed shaft 13 is in meshing engagement with a worm wheel 19 loosely mounted on a sleeve 20 loose on each shaft 15. A pinion 21 on each sleeve is in mesh with rack teeth on a sleeve 22 loose on each spindle whereby to move the spindle axially. A clutch 23 splined to each sleeve and operated by a handle 24 is provided for connecting the sleeve and worm wheel 19, a spring 25 normally keeping the clutch in a disengaged position. The handle 24 is pivoted at 26 and provided with a lateral projection at 27 adapted to be engaged by a shoulder 28 on a lever 29 pivoted at 30. It will be noted that as the handle 24 is pushed downwardly to engage the clutch, the lever 29 by its own weight engages its shoulder 28 behind the projection 27 and holds the clutch in its engaged position. A hand wheel 31 is provided on each sleeve for moving each spindle manually.

With its clutch 23 disengaged, any spindle may be axially traversed manually by rotating the hand wheel 31. By engaging the clutch, the spindle may be fed or traversed axially by power from the feed shaft 13 as hereinafter described. By rotating the shaft 15, its head 5 may be traversed along the rail 4, the screw 14 and worm wheel 16 operating as a rack and pinion. The worm wheel 16 may be held from rotation by a clamping element pivoted at 32 and having one end 33 adapted to engage the worm wheel and its other end 34 adapted to be engaged by an operating screw 35 threaded into the head 5. Tightening of the screw forces the end 33 into clamping engagement with the worm wheel 16. With the worm wheel clamped, rotation of the screw 14 will traverse the head along the rail. It will be understood that all or any number of the heads may be simultaneously traversed in this manner. A pointer 36 on each head is adapted to cooperate with a graduated scale 37 supported in brackets 38 and extending along the several heads whereby the adjustment of each head on the rail 4 may be accurately observed. Furthermore, the heads may be rigidly clamped in position on the rail 4 by clamping screws 39 threadedly engaged with guideway shoes 40.

The spindles are rotated from a shaft 41 extending transversely past each spindle and adapted to be driven at different speeds as hereinafter described. The driving connection from this shaft to each spindle comprises a bevel gear 42 mounted on each head and splined to the shaft 41. A short shaft 43 in the head has a bevel gear 44 on one end thereof meshing with the bevel gear 42 and a pinion 45 on its other end meshing with a gear 46 mounted in the head and into which the spindle is splined for vertical axial movement.

As illustrated in the drawings, the shaft 13 for feeding the spindles and the shaft 41 for rotating the spindles are both driven from a motor 47 mounted on the rear side of the member 3 and to the rear of the rail 4. A pinion 48 on the motor shaft meshes with a large gear 49 in mesh with a gear 50 on a shaft 51. The gear 50 meshes with a gear 52 loose on a parallel shaft 53 and a similar gear 54 on the shaft 51 meshes with a second gear 55 loose on the shaft 53. Either gear 52 or 55 may be operatively connected to the shaft 53 by means of a clutch 56. This clutch is operated by a yoke 57 pivoted at 58. A rod 59 connects the other end of the yoke to one arm 60 of a lever pivoted at 61. The other arm 62 of the lever has a detent 63 adapted to engage either of two holes $a$ or $b$ to hold the clutch in engagement with gears 52 and 55 respectively.

A gear 64 on the end of shaft 53 meshes with a gear 65 keyed to a sleeve 66 loose on a non-rotatable shaft 67. The gear 65 meshes with a gear 68 on the end of shaft 41 from which the spindles are rotated through the individual driving connections to the spindles heretofore described.

As heretofore stated, two driving connections for feeding the spindles are provided, one such connection being frictionally operative and being adapted to feed the spindles for drilling and the other connection being positively operative and being adapted to feed the spindles for tapping. Both such feeds are driven from a pinion 69 integral with or otherwise secured to the sleeve 66. This pinion 69 is in mesh with a pinion 70 keyed to one end of a short shaft 71. The other end of this shaft is provided with clutch teeth 72 engaging clutch teeth in the end of a coaxial shaft 73. Shaft 73 and a parallel shaft 74 are provided with change speed gearing for varying the feeding speed of the spindles for drilling, the shaft 74 and a coaxial shaft 75 being provided with clutch teeth 76 connecting such shafts.

The change speed gearing on shafts 73 and 74 comprises the following: Loosely mounted on the shaft 73 is a pair of integrally connected spur gears 77 and 78. A third gear 79 is splined for sliding movement on shaft 73 and is adapted to be either in meshing engagement with a gear 80 or connected to gear 78 through clutch teeth 81. Gears 80 and 82 are both secured to a sleeve 83 loose on the shaft 74. A third gear 84 spaced from gear 82 is also loose on shaft 74. A double clutch 85 splined to shaft 74 is adapted to connect either gear 82 or 84 to the shaft 74. Clutch gear 79 may be shifted by a yoke 86 pivoted at 87 and connected by a rod 88 to an arm 89. Clutch 85 may be shifted by a yoke 90 pivoted at 91 and connected by a rod 92 to an arm 93. The arm 89 is provided with a detent 89' adapted to engage in holes x for holding the clutch gear 79 in either of its operative positions or in a neutral position. The arm 93 is likewise provided with a detent 93' adapted to engage in holes y for holding the clutch 85 in either of its operative positions or in the neutral position. Upon engaging clutch teeth 81, the shaft 74 may be driven at either one of two speeds by engaging clutch 85 with either gear 82 or 84. Upon meshing gear 79 with gear 80 and engaging clutch 85 with gear 82 a third speed may be imparted to the shaft 74. A fourth speed may also be obtained by engaging clutch 85 with gear 84, gear 79 being in mesh with gear 80.

The shaft 74 is connected to the shaft 75 through clutch teeth 76 as heretofore described. Keyed to this shaft 75 is an outer element 94 of a frictional connection. The inner element 95 thereof is secured to a sleeve 96 loose on the shaft 75. A compression spring 97 normally holds the two friction elements in driving contact. The outer end of element 95 is provided with bevel gear teeth 98 in mesh with a bevel gear 99 on a shaft 100. A worm 101 secured to shaft 100 engages a worm wheel 102 integral or otherwise secured to a sleeve 103 loose on a shaft 104 adjacent and parallel with the aforesaid feed shaft 13. Gearing hereinafter described is provided for operatively connecting the sleeve 103 to the feed shaft 13 for feeding the spindles for drilling.

Loosely mounted on the shaft 75 is a pinion 105 in mesh with the pinion 70. A gear 106 keyed to the shaft 104 is in mesh with the pinion 105. The shaft 104 is therefore rotated directly from the pinions 69 and 70 without going through the drilling feed change speed gearing on shafts 73 and 74 above described. Gearing hereinafter described is provided for operatively connecting the shaft 104 to the feed shaft 13 for positively feeding the spindles for tapping.

Figures 5, 6, 7:
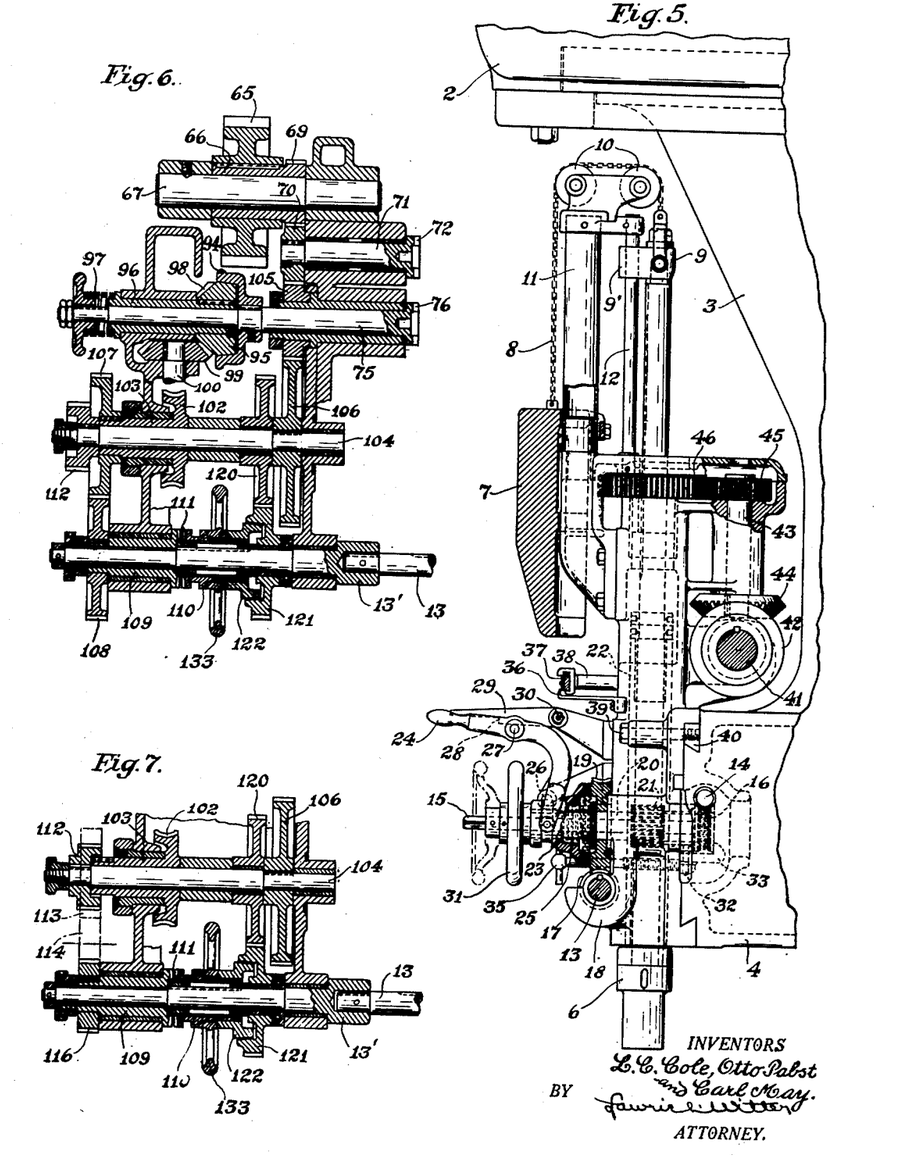
Fig. 5 is an enlarged side elevation of one of the spindle heads.
Fig. 6 is a detailed sectional view showing certain of the spindle feeding mechanism.
Fig. 7 is a fragmentary view of Fig. 6 showing certain changes in the feed gearing.

In Fig. 6 the gearing arrangement illustrated operatively connects the sleeve 103 to the shaft 13 for feeding the spindles for drilling. This arrangement will first be described. Keyed to the end of the sleeve 103 is a gear 107 meshing with a gear 108 keyed to a sleeve 109 loose on a shaft 13' connected to the feed shaft 13. A clutch 110 splined to the shaft 13' is provided with clutch teeth 111 for positively connecting the sleeve 109 to the feed shaft. The driving connection just described and including the change speed shafts 73 and 74 and the frictional connection at 94 and 95 comprises the driving connection for feeding the spindles for drilling. The positive driving connection for feeding the spindles for tapping will now be described.

Figures 1, 8, 9:
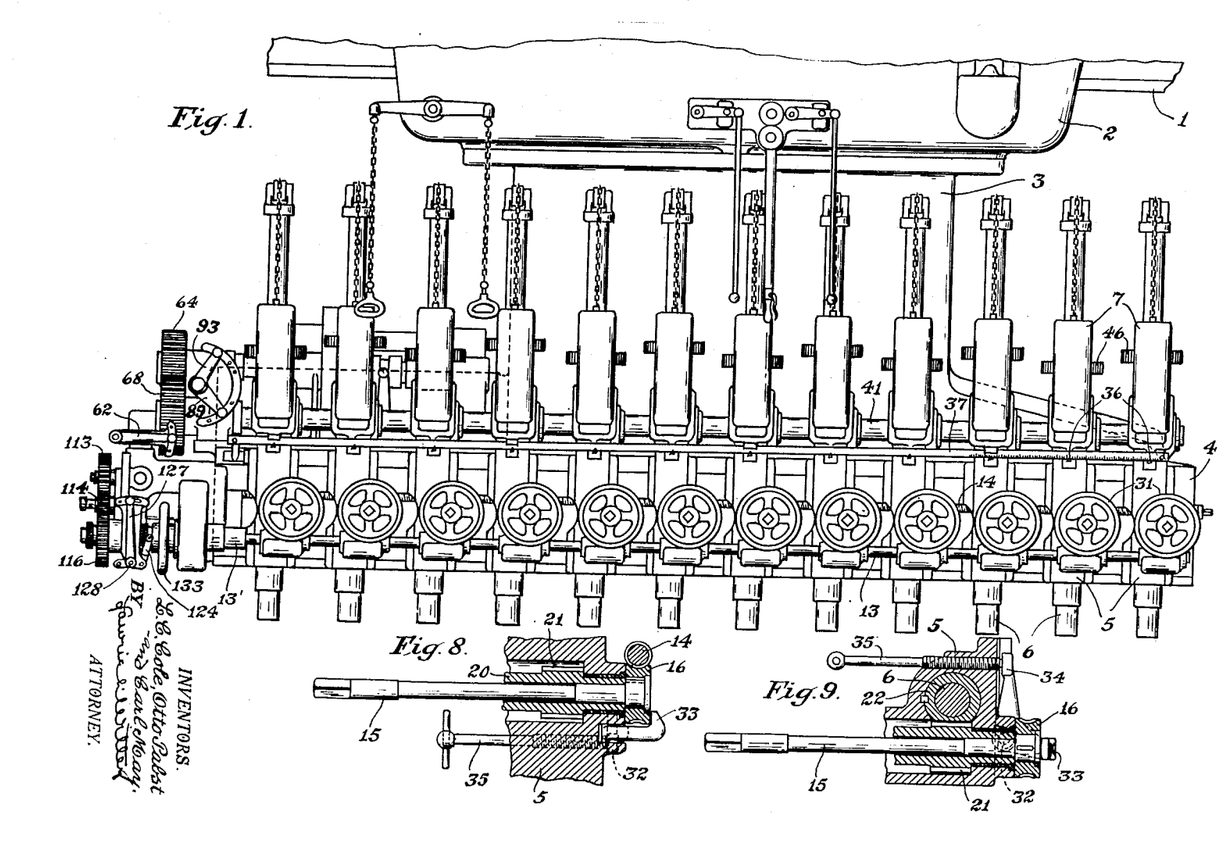
Figure 1 is a front elevation of a portion of a multiple spindle drilling machine comprising our invention.
Fig. 8 is a section on line 8—8 of Fig. 2.
Fig. 9 is a section on line 9—9 of Fig. 2.
Figure 2:
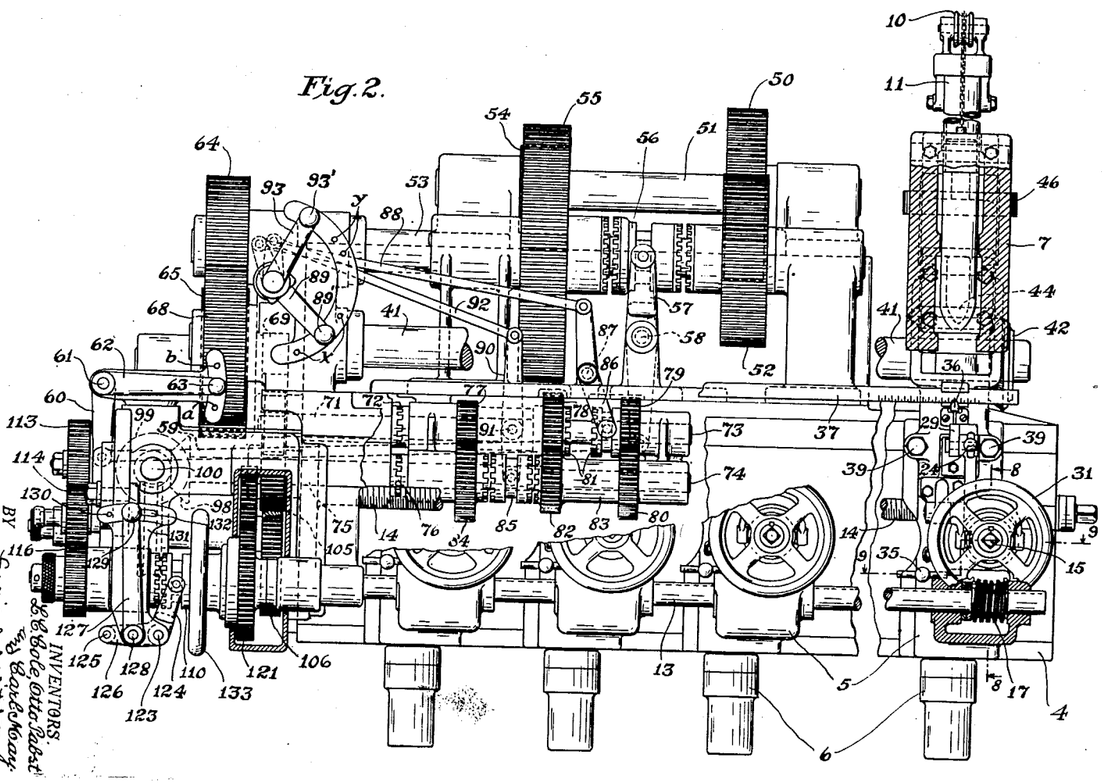
Fig. 2 is an enlarged fragmentary front elevation of the same showing certain parts in section.
Figure 3:
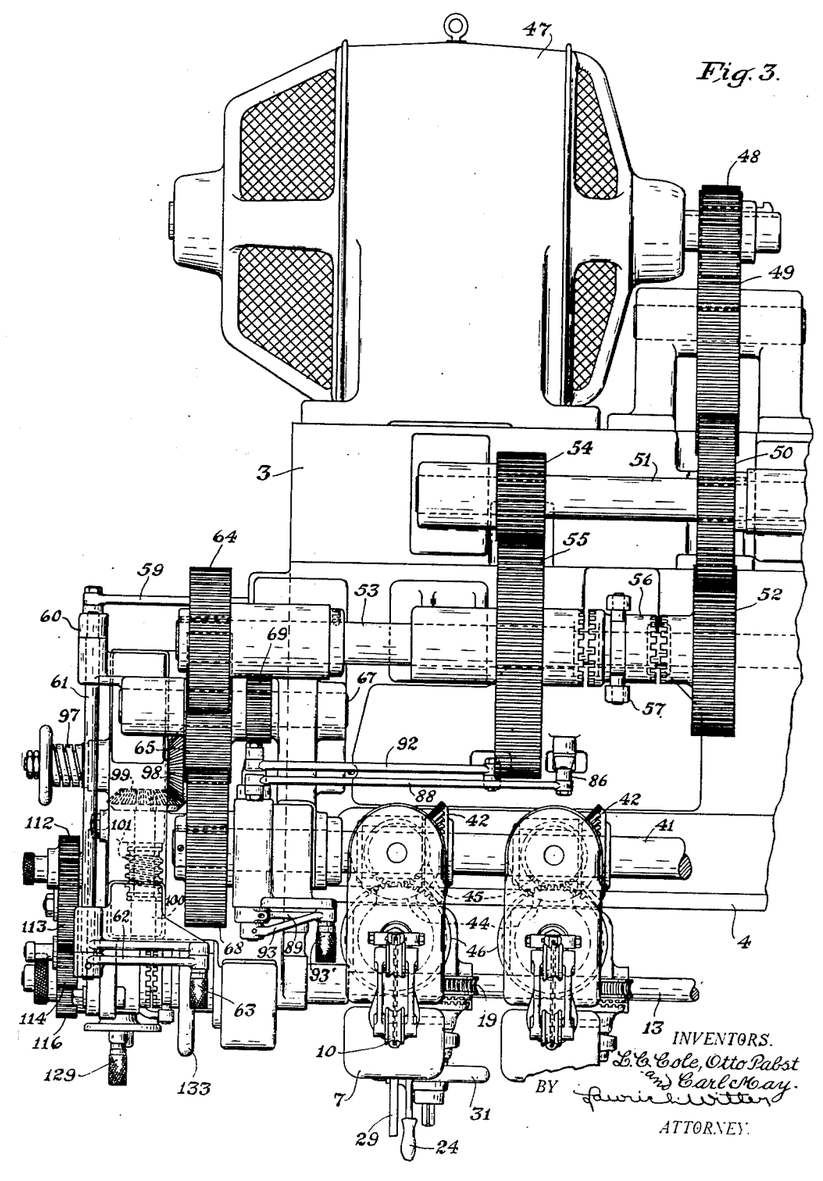
Fig. 3 is a fragmentary plan view thereof.
Figure 4:
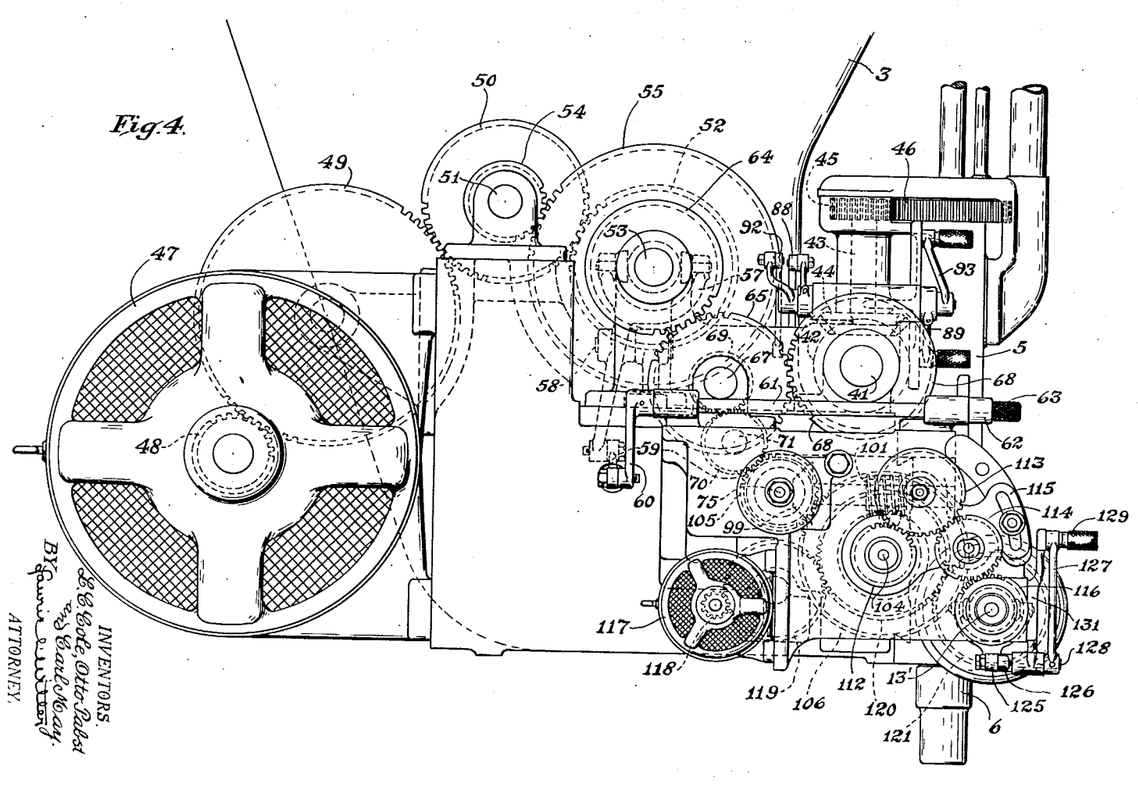
Fig. 4 is an end view.

As illustrated in Figs. 4 and 7, the tapping feed from the shaft 104 is transmitted to the feed shaft 13 as follows: For tapping, the gear 107 is removed from the sleeve 103 and a gear 112 is reversed from the position shown in Fig. 6 to the position shown in Fig. 7, wherein such gear is keyed to the shaft 104 and extends loosely over the sleeve 103. Motion is transmitted from the shaft 104 and its gear 112 through a pair of idler gears 113 and 114 on a bracket 115 to a gear 116 mounted on the sleeve 109 in place of the gear 108, and from thence to the feed shaft 13. With the feeding mechanism thus arranged, the spindles will be positively fed from the motor 47 without going through the change gearing on shafts 73 and 74.

The use of a frictional feed for drilling prevents the breakage of the drills or other parts of the machine should the drills become jammed or the feed be obstructed. From the change speed gearing described, it will be noted that the spindles may be fed at four different speeds for drilling. The feed for tapping provides a positive synchronous interconnection between the rotation of the drill spindles and the feeding movement thereof. This connection positively assures an axial feed of the spindles equal to the pitch of the thread being tapped at each spindle rotation. The novel positive tapping arrangement also insures a simultaneous starting of all the taps in the tapping operation. The speed of spindle feed for tapping can be varied as desired by substituting gears of other sizes for the gears 112 and 116.

In addition to the mechanism as thus far described, means is also provided for rapidly traversing the spindles axially by power or for manually moving the same axially. A separate motor 117 secured to the rear of the rail 4 is preferably provided for rapidly traversing the spindles. A pinion 118 on the motor shaft meshes with a gear 119 in turn meshing with a gear 120 loose on the shaft 104. The gear 120 meshes with a gear 121 loose on shaft 13' and recessed to provide the outer element of a friction clutch. The before-mentioned clutch 110 has a conical portion 122 adapted to engage within the gear recess to frictionally connect such gear to the shaft 13'. When it is desired to traverse the spindles, the clutch 110 is shifted by a yoke pivoted at 123, one arm 124 of the yoke engaging the clutch and the other arm being engaged at 125 by an arm 126 of an operating lever 127 pivoted at 130

128. A detent 129 in the lever is adapted to engage in a hole 130 in a bracket 131 to hold the clutch positively engaged at 111, or the detent may be frictionally clamped in a slot 132 to hold the clutch frictionally engaged with the gear 121. A hand wheel 133 is provided on the clutch 110 whereby the shaft 13 may be rotated and the spindle traversed manually when the clutch is in a neutral position.

What we claim is:

1. In a drilling machine, the combination of a support, a drill spindle thereon, means for rotating the spindle, a feed shaft, and two optional driving connections driven from the said shaft for feeding the spindle axially, one of said connections being adapted to feed the spindle for drilling and the other connection being adapted to positively feed the spindle for tapping.

2. In a drilling machine, the combination of a support, a plurality of drill spindles thereon, a feed shaft operatively connected with the spindles for feeding the same axially, a power element, and two optional driving connections between the power element and the feed shaft, one of said connections being adapted to feed the spindles for drilling and the other connection being adapted to feed the spindles for tapping.

3. In a drilling machine, the combination of a cross rail, a plurality of drill heads slidably mounted thereon, a drill spindle mounted for axial movement in each head, a feed shaft extending along the cross rail and operatively connected with the spindles for feeding the same axially, a power element, and two optional driving connections between the power element and the feed shaft, one of said connections being adapted to feed the spindles for drilling and the other connection being adapted to feed the spindles for tapping.

4. In a drilling machine, the combination of a cross rail, a plurality of drill heads slidably mounted thereon, a drill spindle mounted for axial movement in each head, a feed shaft extending along the cross rail and operatively connected with the spindles for feeding the same axially, a power element, a frictional driving connection between the power element and the shaft for feeding the spindles for drilling, and a positive driving connection between the power element and the shaft for feeding the spindles for tapping, the said driving connections being optionally usable.

5. In a drilling machine, the combination of a cross rail, a plurality of drill heads slidably mounted thereon, a drill spindle mounted for axial movement in each head, a feed shaft extending along the cross rail and operatively connected with the spindles for feeding the same axially, a power element, change speed mechanism, and two optional driving connections between the power element and the shaft, one of said connections being adapted to feed the spindles for drilling and the other connection including change gears in addition to the said change speed mechanism and being adapted to feed the spindles for tapping.

6. In a drilling machine, the combination of a cross rail, a plurality of drill heads slidably mounted thereon, a drill spindle mounted for axial movement in each head, a feed shaft extending along the cross rail and operatively connected with the spindles for feeding the same axially, a power element, change speed mechanism, and two optional driving connections between the power element and the shaft, one of the said connections including change speed gearing in addition to said change speed mechanism and being adapted to feed the spindles for drilling and the other connection including change gears in addition to the said change speed mechanism and the change speed gearing and being adapted to feed the spindles for tapping.

7. In a drilling machine, the combination of a cross rail, a plurality of drill heads slidably mounted thereon, a drill spindle mounted for axial movement in each head, a feed shaft extending along the cross rail and operatively connected with the spindles for feeding the same axially, a power element, a driving connection between the power element and the feed shaft including a shaft adjacent and parallel with the feed shaft, and a second driving connection between the power element and the feed shaft including a sleeve rotatable on the said parallel shaft, one of the said connections being adapted to feed the spindles for drilling and the other connection being adapted to feed the spindles for tapping.

8. In a drilling machine, the combination of a cross rail, a plurality of drill heads slidably mounted thereon, a drill spindle mounted for axial movement in each head, a feed shaft extending along the cross rail and operatively connected with the spindles for feeding the same axially, a power element, a driving connection between the power element and the feed shaft including two parallel shafts with change speed gearing thereon and a sleeve loose on a shaft parallel with the feed shaft, and a second driving connection between the power element and the feed shaft including the said shaft parallel with the feed shaft and two gears respectively fast and loose on the said parallel shafts, one of said connections being adapted to feed the spindles for drilling and the other connection being adapted to feed the spindles for tapping.

9. In a drilling machine, the combination of a support, a plurality of drill spindles thereon, a feed shaft for feeding the spindles axially, a power element, a shaft parallel with the feed shaft, a sleeve loose on the parallel shaft, operative driving connections from the power element to the parallel shaft and the sleeve thereon respectively, and gearing adapted to connect either the sleeve or the shaft with the feed shaft.

10. In a drilling machine, the combination of a cross rail, a plurality of drill heads slidably mounted thereon, a drill spindle mounted for axial movement in each head, a feed shaft extending along the cross rail and operatively connected with the spindles for feeding the same axially, a power element, two optional driving connections between the power element and the feed shaft, one of said connections being adapted to feed the spindles for drilling and the other connection being adapted to feed the spindles for tapping, and power operated means for rapidly traversing the spindles axially.

11. In a drilling machine, the combination of a cross rail, a plurality of drill heads slidably mounted thereon, a drill spindle mounted for axial movement in each head, a feed shaft extending along the cross rail and operatively connected with the spindles for feeding the same axially, a power element, a frictional driving connection between the power element and the shaft for feeding the spindles for drilling, a positive driving connection between the power element and the shaft for feeding the spindles for tapping, the said driving connections being optionally usable, and power operated means for rotating the feed shaft to rapidly traverse the spindles axially.

12. In a drilling machine, the combination of a cross rail, a plurality of drill heads slidably mounted thereon, a drill spindle mounted for axial movement in each head, a feed shaft extending along the cross rail and operatively connected with the spindles for feeding the same axially, a power element, two optional driving connections between the power element and the feed shaft, one of said connections being adapted to feed the spindles for drilling and the other connection being adapted to feed the spindles for tapping, power operated means for rapidly traversing the spindles axially, and means for manually moving the spindles axially either singly or simultaneously.

13. In a drilling machine, the combination of a cross rail, a plurality of drill heads slidably mounted thereon, a drill spindle mounted for axial movement in each head, a feed shaft extending along the cross rail and operatively connected with the spindles for feeding the same axially, a clutch splined to the feed shaft, a hand wheel on the clutch, a power driven spindle feeding element loose on the feed shaft at one side of the clutch, and a power driven spindle traversing element loose on the feed shaft at the other side of the clutch, the feed shaft being adapted to be rotated through the clutch from either of the said elements or from the hand wheel.

14. In a drilling machine, the combination of a portable vertically suspended support, a plurality of laterally adjustable spindles on the support, a feed shaft for feeding the spindles axially, a motor on the support, and two optional driving connections between the motor and the feed shaft, one of said connections being adapted to feed the spindles for drilling and the other connection being adapted to feed the spindles for tapping.

15. In a drilling machine, the combination of a portable vertically suspended support, a plurality of vertically extending spindles on the support, means for adjusting the spindles laterally of the support, a feed shaft for feeding the spindles axially, a motor on the support, a frictional driving connection between the motor and the shaft for feeding the spindles for drilling, and a positive driving connection between the motor and the shaft for feeding the spindles for tapping, the said driving connections being optionally usable.

16. In a drilling machine, the combination of a portable vertically suspended support, a cross rail thereon, a plurality of drill heads slidably mounted on the rail, a drill spindle mounted for axial movement in each head, a feed shaft extending along the cross rail and operatively connected with the spindles for feeding the same axially, a motor on the support to the rear of the rail, and two optional driving connections including change speed mechanism between the motor and the feed shaft, one of said connections being adapted to feed the spindles for drilling and the other connection being adapted to feed the spindles for tapping.

17. In a drilling machine, the combination of a portable vertically suspended support, a plurality of laterally adjustable spindles on the support, a feed shaft for feeding the spindles axially, a motor on the support, two optional driving connections between the motor and the feed shaft, one of said connections being adapted to feed the spindles for drilling and the other connection being adapted to feed the spindles for tapping, and a second motor on the support for rapidly traversing the spindles axially.

18. In a drilling machine, the combination of a portable vertically suspended support, a cross rail thereon, a plurality of drill heads slidably mounted on the rail, a drill spindle mounted for axial movement in each head, a feed shaft extending along the cross rail and operatively connected with the spindles for feeding the same axially, a clutch splined to the feed shaft, a feed gear loose on the feed shaft at one side of the clutch, a traversing gear loose on the feed shaft at the other side of the clutch, the clutch being shiftable into engagement with either of said gears, a feed motor on the support to the rear of the rail and operatively connected to the said feed gear, and a second motor on the support operatively connected to the traversing gear.

In testimony whereof, we hereto affix our signatures.

LYNDON C. COLE.
OTTO PABST.
CARL MAY.